(12) United States Patent
Bjerke

(10) Patent No.: US 6,452,995 B1
(45) Date of Patent: Sep. 17, 2002

(54) DEVICE FOR MEASURING GAS PRESSURE

(75) Inventor: Lars-Eric Bjerke, Furugatan 9, Göteborg S-413 21 (SE)

(73) Assignee: Lars-Eric Bjerke, Gothenburg (SE)

( * ) Notice: Subject to any disclaimer, the term of this patent is extended or adjusted under 35 U.S.C. 154(b) by 0 days.

(21) Appl. No.: 09/077,488

(22) PCT Filed: Sep. 3, 1996

(86) PCT No.: PCT/SE96/01088

§ 371 (c)(1),
(2), (4) Date: Aug. 26, 1998

(87) PCT Pub. No.: WO97/19738

PCT Pub. Date: Jun. 5, 1997

(30) Foreign Application Priority Data

Nov. 30, 1995 (SE) .............................................. 9504283

(51) Int. Cl.$^7$ .............................................. G21C 19/42
(52) U.S. Cl. ...................................................... 376/313
(58) Field of Search ........................ 96/397, FOR 101; 95/24; 261/119.1; 376/313, 245, 247; 137/386, 393, 455, 413, 557; 210/106, 108, 167; 73/299, 290 R, 301, 302

(56) References Cited

U.S. PATENT DOCUMENTS

| 4,567,761 A | * | 2/1986 | Fajeau ...................... 73/290 B |
| 4,807,464 A | * | 2/1989 | Janotta |
| 4,890,491 A | * | 1/1990 | Vetter et al. |
| 5,059,954 A | * | 10/1991 | Beldham et al. |
| 5,115,679 A | * | 5/1992 | Uhlarik |
| 5,207,251 A | * | 5/1993 | Cooks |
| 5,661,228 A | * | 8/1997 | Young .......................... 73/40 |

FOREIGN PATENT DOCUMENTS

| DE | 3835672 A1 | 4/1990 | ........... B01D/37/04 |
| SU | 1580175 | * | 7/1990 | |

* cited by examiner

Primary Examiner—Michael J. Carone
Assistant Examiner—John Richardson
(74) Attorney, Agent, or Firm—Birch, Stewart, Kolasch & Birch, LLP

(57) ABSTRACT

A device for measuring gas pressure that is dependent upon the level of a liquid comprises a pressure indicator or sensor (6, 6') which is connected to an upper part of a tube conduit (7, 7') which is filled with gas and intended to operate in a liquid mass, said conduit having a lower part connected to an upper part of a vessel (8, 8') with a volume that is larger than the volume of the tube conduit. The vessel (8, 8') has an inlet (13) to let the liquid in, which inlet has a cross-sectional area that is smaller than the cross-sectional area of the vessel and that is located near the bottom of the vessel. Therefore, liquid that penetrates into the vessel via the inlet forms a surface whose level in itself in the vessel may vary depending upon the level of the surrounding main liquid mass, however normally without the liquid rising up into the tube conduit (7, 7') as such.

8 Claims, 3 Drawing Sheets

DEVICE FOR MEASURING GAS PRESSURE

BACKGROUND OF THE INVENTION

The basis of the present invention is ultimately the problem of a reliable reverse flushing or cleaning of those strainers in a nuclear power plant that have the task of purifying water in the reactor containment before it is fed into a cooling system. In boiling water reactors the strainers are permanently under water at the bottom of the containment and convey water to a regularly working cooling system and/or to an emergency cooling system which is only started in case of a shutdown. Under normal circumstances, compressed water reactors lack water at the bottom of the containment. Here, the strainers shall only start working in connection with possible shutdowns, during which water is collected at the bottom of the containment. However, in both cases the strainers shall be capable of working in a reliable way in so far as reverse flushing or cleaning is initiated without delay, if and when the strainers are clogged by impurities to a certain extent. Hence, if the strainers are clogged to a too far-reaching extent, the flow of pure water to the cooling system is reduced to a level that may become dangerous. In practice, the degree of clogging of the strainers is controllable by measuring the pressure drop over the individual strainers. As long as the individual strainer is clean, i.e., free from clogging impurities, the pressure drop is minimal, but if fibres and/or other impurities begin to be deposited within and without the apertures of the strainer, the pressure drop increases gradually, to eventually reach a value at which the flow of water to the cooling system becomes inacceptably low.

In practice, the only realistic possibility of determining the pressure drop over a strainer is based upon a comparative measurement of gas pressures. More specifically, tests have been made to provide pressure indicators or sensors for each strainer, at the upper part of a couple of tube conduits, of which one at its lower part is laid to the interior of the strainer, while the other one has its lower part leading into the water mass surrounding the strainer. Thereby, the first sensor shall measure the pressure prevailing inside the strainer, while the second shall measure the reference pressure that prevails in the surrounding water. If the strainer is clean, i.e., it lets water through unobstructedly, these two measured pressures become equal, but as soon as the apertures of the strainers start to be clogged, the pressure within the strainer sinks. This manifests itself as a difference between the pressure that is measured by the two sensors, the magnitude of the pressure difference being a measure of the degree of clogging. Therefore, when the pressure difference has reached a given threshold value, reverse flushing or another cleaning shall be initiated. However, tests performed with measurements of pressure differences have not been successful due to difficulties in holding the tube conduits serving as reference legs clean, i.e., filled with gas only. Thus, if differently large water heads occur in the two reference legs, errors of measurement arise that make a reliable operation alarm or a steering of the strainer cleaning function impossible.

OBJECTS AND FEATURES OF THE INVENTION

In a narrow aspect, the present invention aims at eliminating the above mentioned difficulties and create the prerequisites of a reliable measurement of pressure differences, preferably in order to make possible an adequate cleaning of strainers in nuclear power plants. In a wider aspect, the invention aims at providing a device which already in connection with elementary measuring of an absolute gas pressure functions in a satisfactory way. Thus, a primary object of the invention is to create a gas pressure measuring device having a tube conduit that is always kept dry and that is immersed in or immersable into a liquid.

In one aspect, the invention comprises a device for measuring gas pressure dependent on the level of a liquid surrounding a vessel. The device comprises a pressure indicator or sensor operatively connected via a conduit to a vessel, with volume within the vessel being greater than the volume within the conduit. Liquid entering into the vessel forms a surface whose level will vary depending on the level of the surrounding main liquid mass. Gas is retained within the conduit leading to the sensor as well as in any portion of the vessel above the liquid surface. The vessel includes a liquid inlet having a cross-sectional area smaller than the cross-sectional area of the vessel and located at or adjacent to the bottom of the vessel for entry of a liquid into the vessel whereby the liquid partly or substantially fills the vessel without rising into the conduit. The gas pressure within the conduit accordingly increases with an increase in level of the liquid within the vessel.

In a further aspect, the invention comprises two devices as characterized above, positioned substantially in a common horizontal plane. The inlets of the vessels of both devices open towards the surrounding main liquid mass with the inlet of the first device in direct communication with the liquid mass and the inlet of the second device being coupled to a strainer or filter for straining or filtering liquid passing into the second vessel. The filtered liquid may be further conveyed to a consumption unit such as cooling system in a nuclear plant. The first sensor establishes a base level, with the interior of the first vessel having a gas pressure substantially exclusively dependent on the liquid level of the main liquid mass. Within the second vessel the gas pressure is dependent on both the level of the main liquid mass and a pressure drop indicative of a clogging of the filter or strainer.

BRIEF DESCRIPTION OF THE APPENDED DRAWINGS

In the drawings

DETAILED DESCRIPTION OF A PREFERRED EMBODIMENT OF THE INVENTION

Figure 1:
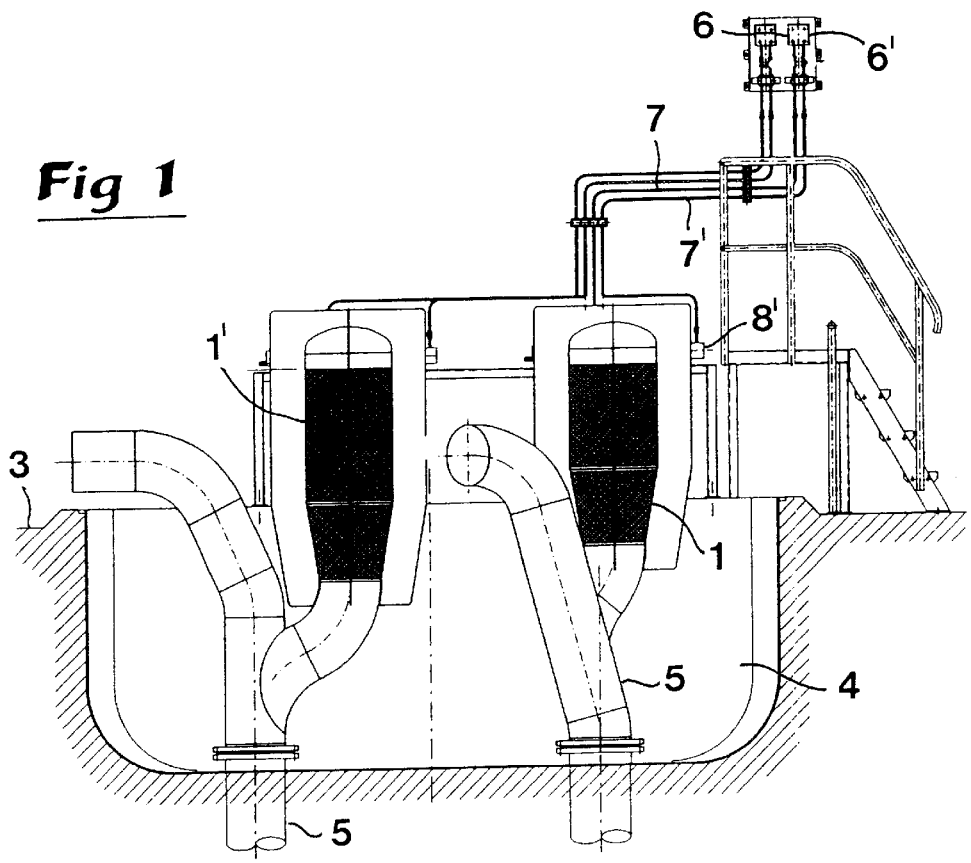
FIG. 1 is a side view showing two strainers comprised in a nuclear power plant.
Figure 2:
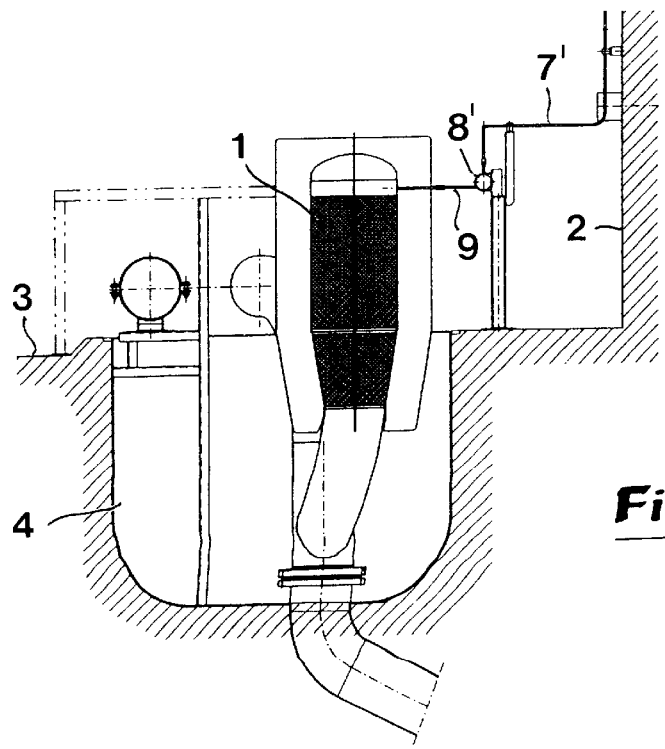
FIG. 2 is a view in an angle of 90° to the view according to FIG. 1.

In FIGS. 1 and 2 reference numerals 1, 1' designate two strainers, which are mounted at the bottom of a reactor containment, whose wall is designated 2 and whose bottom is indicated at 3. The strainers are partly immersed in a pit or depression 4 and are separately connected to conduits 5 for the feeding of water into a cooling system (not shown). In the example, the nuclear power plant is thought to work with a compressed water reactor. This implies that under normal circumstances, the bottom of the reactor containment lacks water. However, at a possible shutdown water may accumulate at the bottom and create a water mass that entirely surrounds the strainers 1, 1'. In case the strainers were mounted to serve a boiling water reactor, the reactor containment would contain a bottom water mass in which the strainers would be fully immersed also under normal running circumstances.

Onwards, the invention is described under the presumption that the strainers work in water.

Figure 3:
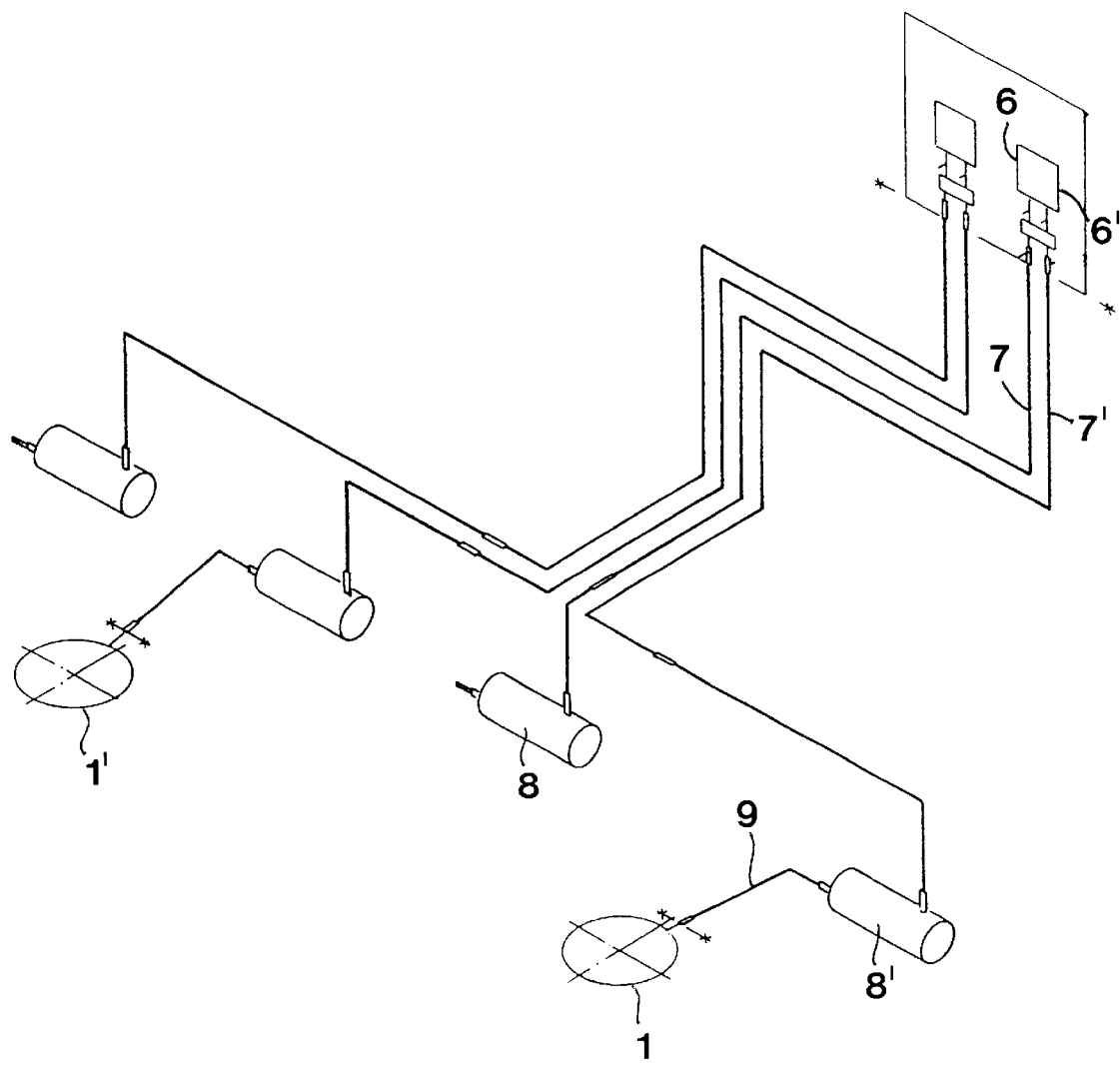
FIG. 3 is a schematic illustration of a gas pressure measuring device according to the invention.

To each strainer 1 and 1', respectively, is connected a measuring device whose main components consist of two pressure indicators or sensors 6, 6', two tube conduits 7, 7' and two vessels 8, 8'. As indicated in FIG. 3, the two vessels 8, 8' are located at one and the same level, i.e., in a common horizontal plane. The first vessel 8 opens substantially directly towards the surrounding main water mass, while the second vessel 8' is connected with the strainer 1 via a secondary tube conduit 9 that extends horizontally between the vessel and the strainer.

Figure 4:
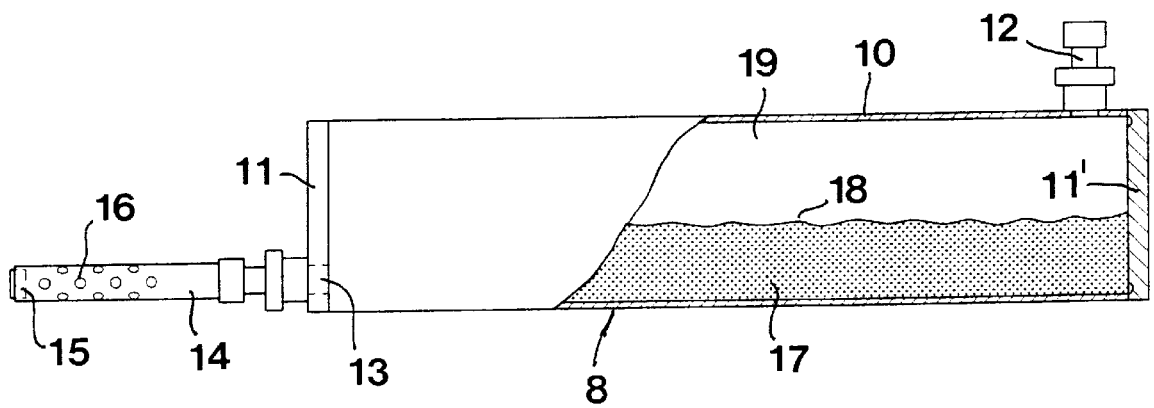
FIG. 4 is a partly cross-sectional view showing a vessel of a first type comprised in the device.
Figure 6:
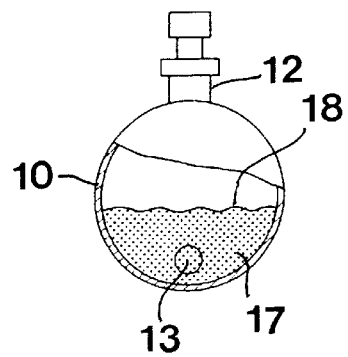

Reference is now made to FIGS. 4 and 6, which show the nature of the two vessels 8, 8' in more detail. In both cases, the vessel comprises a cylinder or a cylindrical wall 10 which is sealed at its opposed ends by means of gable walls 11, 11'. The cylinder is long and narrow and placed horizontally. In practice, the cylinder may have a diameter within the range of 80 to 100 mm and a length that is 3 to 5 times larger than the diameter. Therefore, the volume of the vessel may amount to about 2 to 4 $dm^3$. In the proximity of one of the gable walls 11' is provided a coupling means 12 connected to the upper part of the vessel, which coupling means may be connected to the previously mentioned tube conduits 7 and 7', respectively.

Figure 5:
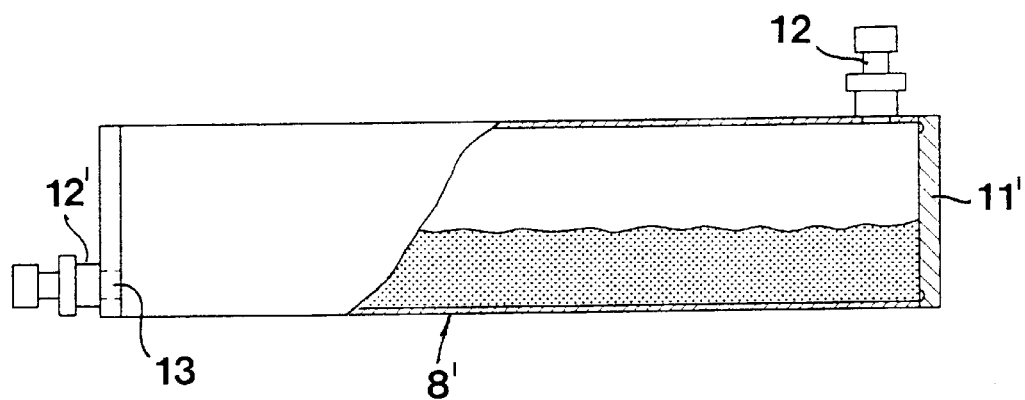
FIG. 5 is a corresponding view showing a second type of vessel, and FIG. 6 a partly cross-sectional end view of a vessel according to FIG. 4 or 5.

In the opposed gable wall 11' is made an aperture 13 serving as an inlet, which aperture is placed near the bottom of the vessel and has a cross-sectional area which is considerably smaller than the cross-sectional area of the cylinder 10. At the vessel 8' according to FIG. 5, a coupling means 12' is connected to the aperture 13, which coupling means may be connected to the horizontal secondary tube conduit 9. Contrary thereto, at the vessel 8 according to FIG. 4, a short piece of tube 14 is connected to the aperture 13, which piece of tube is sealed at its free end by means of a gable 15. In the tube wall are recessed a plurality of small apertures 16, through which water can pass into the interior of the piece of tube and via the aperture 13 into the interior of the cylinder or the vessel. By the fact that the piece of tube includes these small apertures, which are substantially evenly distributed over the tube envelope, it is guaranteed that at least some of the apertures enable a liquid communication between the surrounding main water mass and the interior of the vessel, although some other would unintentionally be clogged by impurities. The water designated by 17 forms a surface or a mirror 18, above which there is an air or gas cushion 19.

Each one of the two tube conduits 7, 7' that are connected to the vessels 8, 8' should have a limited diameter in order to guarantee that the total volume of the tube conduits becomes many times smaller than the volume of the vessels 8, 8'. In this way, it is guaranteed that the vessels receive a sufficient gas volume to keep the conduits filled with gas at all occurring pressure variations and water levels in the surroundings. In practice, the diameters of the tube conduits may be within the range 8 to 20 mm, preferably 10 to 15 mm, or most suitably 12 to 13 mm. As a practical example, it may be mentioned that the longest conduit 7' may have a length of 5 meters and a diameter of 12,7 mm. Then the conduit obtains a volume of 0,63 $dm^3$. At the same time, the vessel 8' may have a volume of 3,24 $dm^3$, i.e., a volume that is about 5,2 times larger than the volume of the tube conduit. In practice, the volume of the vessel should be 4 to 7, prefereably 5 to 6 times larger than the volume of the tube conduit.

It is essential that the two vessels 8, 8' be located in a common horizontal plane, so that differences in the statical liquid columns between the vessels do not influence measurements of pressure differences. More specifically, the two inlet apertures 13 shall be located at one and the same level.

THE FUNCTION OF THE DEVICE ACCORDING TO THE INVENTION

Assume that a shutdown occurs and that the strainers 1, 1' start working in connection with an accumulation of water at the bottom of the reactor containment. The two vessels 8, 8', which are located approximately on a level with the appurtenant strainer, will then be filled with water substantially simultaneously. Depending upon how high the surrounding main water mass rises in relation to the level of the vessels, a more or less high gas pressure will be created in the air cushion 19 and the interior of the tube conduits 7, 7'. These gas pressures may be detected by the sensors 6, 6' (or by a gauge indicator for pressure differences common for both conduits). As long as the individual strainer, e.g. the strainer 1, is clean, equally large air or gas pressures prevail in the vessels 8, 8'. However, if impurities start clogging the apertures in the strainer, the water pressure in it will decrease in relation to the pressure in the surrounding main water mass. This will have the consequence that the water level 18 in the vessel 8' sinks somewhat and that the gas pressure in this vessel is reduced. In other words, a difference arises between the gas pressures in the vessels 8, 8' and the appurtenant tube conduits, which difference may be read by the sensors 6, 6'. Here, the magnitude of the gas pressure difference constitutes a measure of the degree of clogging of the strainer. When the pressure difference has reached a predetermined magnitude, reverse flushing or any other suitable cleaning of the strainer is initiated in a suitable way. In practice, the cleaning of the strainer may be accomplished either in an automatic way or by the sensors starting an alarm which in turn is utilized by the staff to manually start the cleaning operation.

An essential advantage of the device according to the invention is that the vertical parts of the measuring legs, i.e., the tube conduits 7, 7', always are kept dry, whereby the pressure measuring or indicating is not influenced by varying liquid columns. By the fact that the volume of the vessels 8, 8' is many times larger than the volume of the tube conduits, this condition is guaranteed also if the level of the surrounding main water mass would rise to a considerable level above the vessels. From the individual strainer extends the tube conduit 9, which serves as a measuring leg, horizontally to the appurtenant reference level vessel; something that involves that the measurement is not influenced by the fact whether this tube conduit is wholly filled with water or contains air. The pressure difference at the difference pressure gauge indicator or the sensors is the same as at the measurement sites, independently of the surrounding pressure or liquid level.

Sometimes wave formations or other sudden water motions may arise in the containment, which in extreme cases may lead to that water in an uncontrolled way is pressed up into the conduits 7, 7'. However, by the fact that these conduits have a pronounced, albeit limited diameter (e.g. 12 to 13 mm), it is guaranteed that the water is not withheld by the surface tension, but may flow back down into the vessel when the conditions return to normal.

FEASIBLE MODIFICATIONS OF THE INVENTION

The invention is not restricted solely to the embodiment as described and shown in the drawings. Thus, in a wider aspect the invention is also applicable to the measuring of absolute gas pressures, i.e., without difference pressures being measured or indicated. In such cases, one single vessel may be included in a tube conduit and form a reference point or a reference vessel that forms a starting point from which a measurement may take place, independently of the level of the surrounding water or liquid mass. In this context it is underlined that the vessel, by being elongated and horizontal, guarantees that the level of the liquid enclosed in the vessel will vary within narrow limits even if the level of the surrounding liquid mass varies quite considerably.

What is claimed is:

1. A device for filtering or straining a liquid with a filter or strainer and assessing the degree of clogging of the filter or strainer, comprising a filter or strainer having a first side for facing a liquid mass and an opposed second side; first and second substantially identical vessels positioned substantially in a common horizontal plane on opposing sides of said filter or strainer; first and second gas pressure indicators or sensors associated with respective of said vessels and each sealing connected via first and second gas-filled conduits to an upper part of a respective corresponding vessel, each vessel having a cross-sectional area, said conduit and vessel both having an interior volume whereby the interior volume of each vessel is between 4 and 7 times larger than the interior volume of the corresponding conduit, each vessel having an inlet for communication with a common liquid mass having a surface level which inlet has a cross-sectional area that is smaller than the cross sectional area of the corresponding vessel and which is located near the bottom of the corresponding vessel, whereby said device is arranged such that liquid entering the vessel via the inlet establishes a surface level within the vessel whose position varies with the level or pressure of the surrounding main liquid mass whereby the gas pressure within each of said vessel and conduit varies in response to changes in the liquid level within each said vessel while said conduits remain filled with gas, said first sensor or indicator establishing a base level representative of the liquid pressure within the common liquid mass, the inlet of the second vessel being connected to a strainer or filter, for straining or filtering liquid entering the second vessel from said liquid mass, the gas pressure within said second vessel being indicative of a pressure drop resulting from said filtering or straining operation, said pressure decreasing as said filter or strainer becomes clogged.

2. A device according to claim 1 wherein liquid within said second vessel exits said vessel via an outlet conduit.

3. A device according to claim 1 having a secondary tube conduit between said filter or strainer and said inlet.

4. A device according to claim 3 wherein said secondary tube conduit is generally horizontal.

5. A device according to claim 1 wherein the interior volumes of the first and second vessels are each between 5 and 6 times the interior volumes of the corresponding first and second conduits.

6. A device according to claim 1 wherein the conduit has an inner diameter of between 8 and 20 mm.

7. A device according to claim 6 wherein the conduit has an inner diameter between 12 and 13 mm.

8. A device according to claim 1 wherein the inlet of the first vessel is for communicating with the liquid mass through a tubular member having a wall and closed distal end and a plurality of apertures within said wall to admit liquid into said inlet, said apertures having a sufficient size to limit clogging of at least some of said apertures by impurities.

* * * * *